United States Patent
Zou et al.

(10) Patent No.: US 11,121,899 B2
(45) Date of Patent: Sep. 14, 2021

(54) SIGNAL QUALITY CONTROL METHOD FOR BASESTATIONS HAVING MULTIPLE ANTENNAS

(71) Applicant: HUAWEI TECHNOLOGIES CO., LTD., Shenzhen (CN)

(72) Inventors: Zhiqiang Zou, Shanghai (CN); Honglin Chai, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 92 days.

(21) Appl. No.: 16/658,380

(22) Filed: Oct. 21, 2019

(65) Prior Publication Data

US 2020/0052946 A1 Feb. 13, 2020

Related U.S. Application Data

(63) Continuation of application No. PCT/CN2017/081482, filed on Apr. 21, 2017.

(51) Int. Cl.
*H04L 27/26* (2006.01)
*H04B 7/0456* (2017.01)
*H04L 5/00* (2006.01)

(52) U.S. Cl.
CPC ....... *H04L 27/2623* (2013.01); *H04B 7/0456* (2013.01); *H04L 5/0007* (2013.01); *H04L 27/2615* (2013.01)

(58) Field of Classification Search
None
See application file for complete search history.

(56) References Cited

U.S. PATENT DOCUMENTS

2012/0093260 A1  4/2012 Liu
2013/0242930 A1  9/2013 Takahashi et al.
(Continued)

FOREIGN PATENT DOCUMENTS

CN  101350646 A  1/2009
CN  101582746 A  11/2009
(Continued)

OTHER PUBLICATIONS

Nokia et al., "On PAPR/CM reduction techniques over QPSK/DFT-S-OFDM uplink", 3GPP TSG-RAN WG1 #87, R1-1612270, Nov. 18, 2016, total 6 pages.
(Continued)

*Primary Examiner* — Anh Ngoc M Nguyen
(74) *Attorney, Agent, or Firm* — Maier & Maier, PLLC

(57) ABSTRACT

Embodiments relate to a signal quality control method and a base station. The method includes: determining, by the base station based on a clipping threshold corresponding to each of the plurality of antennas, a time-domain noise signal for clipping a first time-domain signal of each antenna; performing time-frequency transformation on the time-domain noise signal of each antenna to obtain a first frequency-domain noise signal; processing the first frequency-domain noise signals of the plurality of antennas jointly to decompose the first frequency-domain noise signals into a second frequency-domain noise signal set in L flow directions and/or a third frequency-domain noise signal set in a complementary space of the L flows; and using the second frequency-domain noise signal set and/or the third frequency-domain noise signal set to clip the first time-domain signal set. According to the embodiments, noise signals are processed jointly.

18 Claims, 18 Drawing Sheets

(56) References Cited

U.S. PATENT DOCUMENTS

| | | | |
|---|---|---|---|
| 2014/0348254 A1 | 11/2014 | Lee et al. | |
| 2015/0200797 A1* | 7/2015 | McCallister | H04L 27/2623 |
| | | | 370/329 |
| 2016/0043889 A1* | 2/2016 | Lozhkin | H04L 27/2623 |
| | | | 375/295 |
| 2017/0078133 A1* | 3/2017 | Terry | H04L 27/2614 |

FOREIGN PATENT DOCUMENTS

| | | |
|---|---|---|
| CN | 102111368 A | 6/2011 |
| CN | 102325118 A | 1/2012 |
| CN | 105871769 A | 8/2016 |

OTHER PUBLICATIONS

Ericsson, "TP on spatial domain impacts of AAS", 3GPP TSG-RAN WG4 meeting #65, R4-126685, Nov. 16, 2012, total 16 pages.

Prabhu et al., "A low-complex peak-to-average power reduction scheme for OFDM based massive MIMO systems", ISCCSP 2014, IEEE, 2014, pp. 114-117, XP032627125.

* cited by examiner

SIGNAL QUALITY CONTROL METHOD FOR BASESTATIONS HAVING MULTIPLE ANTENNAS

CROSS-REFERENCE TO RELATED APPLICATIONS

This application is a continuation of International Application No. PCT/CN2017/081482, filed on Apr. 21, 2017, the disclosure of which is hereby incorporated by reference in its entirety.

TECHNICAL FIELD

Embodiments relate to the communications field, and in particular, to a signal quality control method and a base station.

BACKGROUND

Signal quality control often involves control of two parameters: a peak to average power ratio (PAPR) and an error vector magnitude (EVM). The following briefly describes the two parameters.

1. PAPR

PAPR is a ratio of peak power to average power. A greater PAPR requires a more capable power amplifier, in which case efficiency of the power amplifier is lower. Therefore, the lowest possible PAPR is desired.

2. EVM

An error vector is a vector that includes an amplitude and a phase, indicating a vector difference at a given time between an ideal error-free reference signal and an actually transmitted signal. A mathematical expression of the EVM is as follows:

$$EVM = \sqrt{\frac{\sum_{n=0}^{N-1}|R(n)-M(n)|^2}{\sum_{n=0}^{N-1}|R(n)|^2}} \times 100\% = \sqrt{\frac{\sum_{n=0}^{N-1}|E(n)|^2}{\sum_{n=0}^{N-1}|R(n)|^2}} \times 100\%,$$

where

R(n) represents a reference signal, M(n) represents an actually measured signal, and E(n)=R(n)−M(n) is an error signal. In the EVM expression, the measured signal is a signal actually measured by a receiver, and the reference signal is obtained through ideal modulation on a demodulation result of the measured signal.

Reducing the PAPR introduces an EVM. A greater threshold T used for PAPR reduction comes with a smaller EVM, and a smaller threshold T comes with a greater EVM. A smaller EVM produces better performance A greater threshold T used for PAPR reduction is accompanied by a worse effect of PAPR reduction. In conclusion, in the prior art, PAPR reduction and EVM reduction conflict with each other in signal quality control, and therefore signal quality control is not effective.

An orthogonal frequency division multiplexing (OFDM) technology is widely used, for example, in long term evolution (LTE), a common communication standard today. The OFDM technology divides a channel into a plurality of orthogonal sub-channels, and data is modulated on each sub-channel for transmission. Orthogonal signals can be separated using an appropriate technology at a receiving end. As a result, mutual interference between sub-channels can be reduced, and reception is made easier.

The OFDM technology has many advantages, such as a strong anti-attenuation capability and high frequency utilization. However, an OFDM signal is a sum of a plurality of independent modulated sub-carrier signals, and while such a synthetic signal generates relatively high peak power and hence a rather high PAPR, it results in lower PA efficiency. In order to reduce impact of a high PAPR, OFDM systems all include a PAPR reduction technology to control power amplifier efficiency.

In a multiple-input multiple-output (MIMO) technology, a plurality of antennas are used at a transmit end to send separate signals, and at a receiving end, a plurality of antennas are used to receive these signals from which original information is recovered. The MIMO technology can significantly increase a data throughput of a system without increasing bandwidth and transmission power, and therefore is a transmission and reception technology commonly used in LTE systems. In a massive MIMO system, also known as a large-scaled antenna system, transmitted signals are preprocessed, enabling a base station to serve a plurality of terminals simultaneously and to control signal interference between different terminals when simultaneously sending signals to the terminals. Refer to a schematic diagram of a massive MIMO system shown in FIG. 1. The system capacity is greatly improved without increasing bandwidth and station resources. The massive MIMO technology is a trend of future network development, and is a key technology for next generation wireless communications systems. The PAPR reduction technology is a necessity for an OFDM system. Refer to a schematic diagram of peak to average power ratio reduction shown in FIG. 2. A common practice is to clip and add a filter for suppressing out-of-band extension to perform filtering. A primary process is as follows:

1. Find a position at which an amplitude of a signal s exceeds a preset threshold T.
2. Generate a peak clipping signal s' at the found position.
3. Pass s' through a filter f0.
4. Subtract a signal obtained in step 3 from the original signal.

The foregoing steps are repeated until a preset target PAPR or a maximum quantity of repetitions is reached.

With such processing in the prior art, PAPR reduction and EVM reduction conflict with each other, and therefore signal quality control is not so effective.

SUMMARY

Embodiments provide a signal quality control method and a base station, which implement effective signal quality control.

According to an aspect, an embodiment provides a signal quality control method, where the method is applied to a base station having a plurality of antennas, the base station uses the antennas to send a first time-domain signal set, so as to send L flows, and the method includes: determining, by the base station based on a clipping threshold corresponding to each of the plurality of antennas, a time-domain noise signal for clipping a first time-domain signal of each antenna; performing time-frequency transformation on the time-domain noise signal of each antenna to obtain a first frequency-domain noise signal; processing the first frequency-domain noise signals of the plurality of antennas jointly to decompose the first frequency-domain noise signals into a second frequency-domain noise signal set in L flow directions and/or a third frequency-domain noise signal set in a complementary space of the L flows; and using the second frequency-domain noise signal set and/or the third frequency-domain noise signal set to clip the first time-domain signal set.

In this embodiment, an optimal clipping noise allocation solution is obtained with reference to information reported by the terminals or information measured by the base station and data characteristics delivered by the base station, that is, a joint noise allocation solution based on all antennas and all users. This can improve overall system efficiency.

In a possible implementation, the second frequency-domain noise signal set is weighted based on a modulation scheme of each of the L flows, where L is an integer and the third frequency-domain noise signal set is weighted based on a weight of the complementary space of the L flows, to obtain a fourth frequency-domain noise signal set; and time-frequency transformation is performed on the first time-domain signal set to obtain a first frequency-domain signal set, and the fourth frequency-domain noise signal set is used in frequency domain to clip the first frequency-domain signal set; or time-frequency transformation is performed on the fourth frequency-domain noise signal set to obtain a fourth time-domain noise signal set, and the fourth time-domain noise signal set is used in time domain to clip the first time-domain signal set. According to this implementation, different magnitudes of clipping noises are allocated based on modulation schemes of different sent flows, different tolerances of different modulation schemes to an EVM are taken into account, and frequency-domain degrees of freedom are utilized to reduce a PAPR more flexibly, thereby improving overall performance.

In a possible implementation, the signal quality control method is performed after precoding and before generation of an OFDM signal, and the precoding includes: dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the antennas, where P, p, and L are integers. According to this implementation, an optional opportunity for performing the signal quality control method is provided, and through grouping, terminals with similar channel states are divided into a group for processing. This can effectively improve overall performance.

In a possible implementation, before the determining, by the base station based on a clipping threshold corresponding to each antenna, a time-domain noise signal for clipping a first time-domain signal of each antenna, the base station performs time-frequency transformation on the first frequency-domain signal set to obtain the first time-domain signal set sent by the antennas. According to this implementation, the time-frequency transformation is performed first, and then a noise signal is extracted in time domain, thereby facilitating noise extraction.

In a possible implementation, the signal quality control method is performed after precoding and generation of an OFDM signal, and the precoding includes: dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the antennas. According to this implementation, another optional opportunity for performing the signal quality control method is provided, and through grouping, where terminals with similar channel states are divided into a group for processing. This can effectively improve overall performance.

In a possible implementation, the L flows are L flows processed using a precoding matrix; and the first frequency-domain noise signals of the antennas are processed jointly to decompose, based on the precoding matrix, the first frequency-domain noise signals into the second frequency-domain noise signal set in the L flow directions and the third frequency-domain noise signal set in the complementary space of the L flows. According to this implementation, noise allocation is performed using the precoding matrix. This can effectively improve overall performance.

According to another aspect, an embodiment provides a base station. The base station can implement functions in the foregoing method example, and the functions may be implemented by hardware, or may be implemented by hardware executing corresponding software. The hardware or the software includes one or more modules corresponding to the functions.

In a possible design, a structure of the base station includes a processor and a plurality of antennas. The processor is configured to support the base station in performing the corresponding functions in the foregoing method. The plurality of antennas are configured to support communication between the base station and another network element. The base station may further include a memory. The memory is configured to be coupled to the processor and store a program instruction and data that is necessary for the base station.

According to still another aspect, an embodiment provides a computer storage medium, configured to store a computer software instruction used by the base station, where the computer software instruction includes a program designed for executing the foregoing aspects.

DESCRIPTION OF EMBODIMENTS

To demonstrate the purpose, technical solutions, and advantages of the embodiments, the following describes the technical solutions of the embodiments with reference to the accompanying drawings in the embodiments.

Usually, PAPR reduction processing involves merely independent processing of a single channel. In the embodiments, multi-channel (multi-antenna) signals are processed jointly. For an $N_{Tx}$ transmit antenna system, an actual quantity of transmitted data flows is less than or equal to $N_{Tx}/2$, which means that still half of dimensions are available in space domain. This further reduces a PAPR and improves overall system efficiency.

Figure 1:
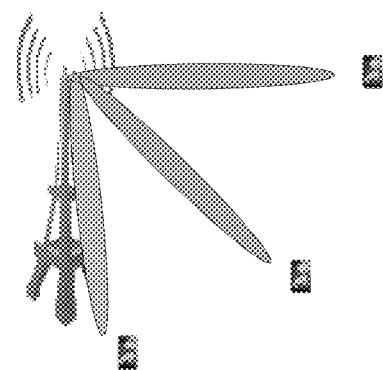
FIG. 1 is a schematic diagram of a massive MIMO system.
Figure 2:
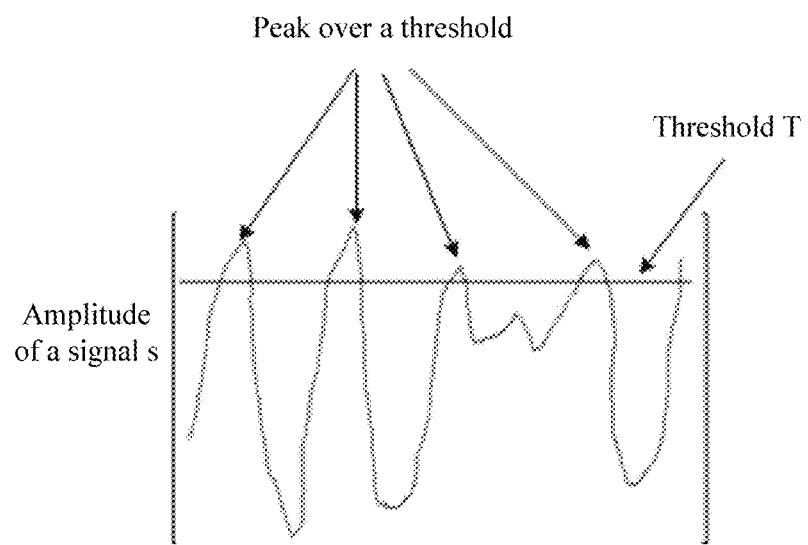
FIG. 2 is a schematic diagram of reducing a peak to average power ratio.
Figure 3:
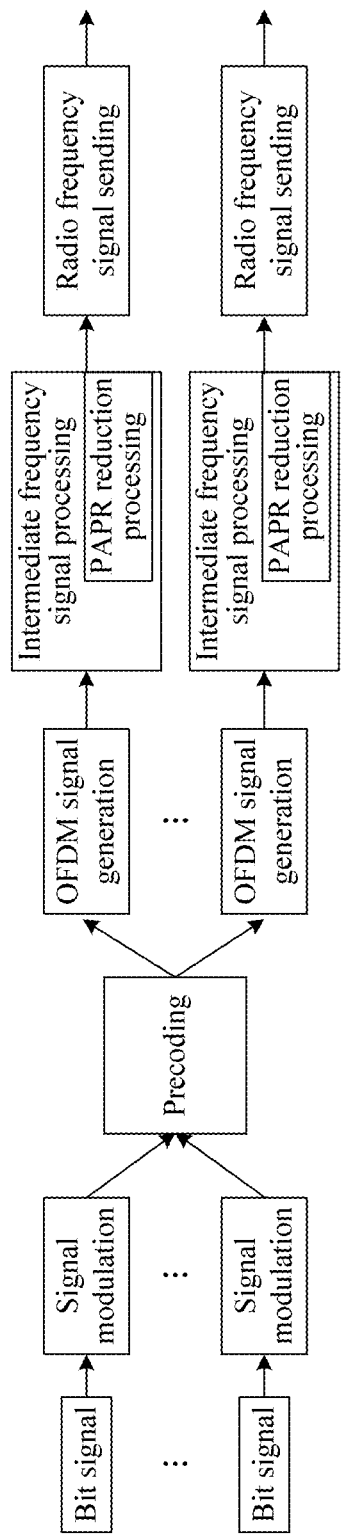
FIG. 3 is a schematic diagram of a common signal sending process.

For ease of understanding of the solutions provided in the embodiments, the embodiments provide a common signal sending flow for comparison. FIG. 3 is a schematic diagram of a common signal sending process. Generally, a rough signal sending flow is shown in FIG. 3, a PAPR reduction technology is used in intermediate frequency processing. After generation of an OFDM signal, inverse fast Fourier transformation (IFFT) is usually used to generate an OFDM signal. According to an IFFT principle, the generated signal s is:

$$s(t) = \frac{1}{\sqrt{N}} \sum_{k=0}^{N-1} \left( X(k) e^{j\frac{2\pi kt}{N}} \right), t = 0, 1, \ldots, N-1$$

N is a total length of IFFT, and X(*) is a frequency-domain signal obtained after modulation or precoding.

It can be understood from the foregoing formula that each sampling point of the signal s is a weighted combination of a plurality of frequency-domain signals, but which frequency-domain signals are included in the signal s cannot be directly figured out from the signal s itself.

In common PAPR reduction processing, a clipping noise n(t) is obtained by using a preset threshold T:

$$n(t) = \begin{cases} \frac{T - |s(t)|}{|s(t)|} s(t), & |s(t)| > T \\ 0, & \text{other} \end{cases}, t = 0, 1, \ldots, N-1$$

The clipping noise n(t) is filtered to obtain a new clipping noise n'(t), and n'(t) is clipped to obtain a new signal s':

$$s'(t) = s(t) - n'(t), t = 0, 1, \ldots, N-1$$

According to a fast Fourier transformation (FFT) principle, the noise n'(t) is introduced in time domain, and a noise N(k) of the same power is introduced in frequency domain, where k=0, 1, ..., N–1. In other words, a noise is added to an original frequency-domain signal X(k). For a receiving end, a received signal X'(k) includes a noise:

$$X'(k) = X(k) + N(k), k=0, 1, \ldots, N-1$$

An EVM can be calculated according to the foregoing formula:

$$E(M) = \sqrt{\frac{\sum_{m_i=M} |N(i)|^2}{\sum_{m_i=M} |X(i)|^2}} \times 100\%,$$

where M represents a modulation scheme, and $m_i$ represents a modulation scheme of X(i). A value of $|N(i)|^2$ is related to the threshold T, and a smaller T indicates a larger value of $|N(i)|^2$.

Different modulation schemes have different tolerances to the EVM, and a greater order indicates a lower tolerance. For example, indicators of quadrature phase shift keying (QPSK), 16 quadrature amplitude modulation (QAM), 64QAM, and 256QAM given in the 3rd generation partnership project (3GPP) technical specification (TS) 36104-d10 are 17.5%, 12.5%, 8%, and 3.5%, respectively.

On one hand, in common PAPR reduction, processing is not based on the modulation scheme of a signal, but the same noise is added to signals of all modulation schemes. As a result, when a plurality of modulation schemes coexist, or when a clipping threshold is unchanged, a high-order EVM deteriorates, and performance deteriorates; or when a threshold is higher, the PAPR reduction capability decreases, and power amplifier efficiency also decreases. A signal itself may include signals of different modulation schemes, when a noise is added to the signal, or in other words, the same noise is added in different modulation schemes, if a high-order modulation signal having a high signal quality requirement (having a low EVM requirement) exists, the tolerable noise magnitude is limited, that is, a peak to average power ratio reduction capability is rather limited. As a result, efficiency of a power amplifier is low, and the requirement for hardware of the power amplifier is high, or a sent signal cannot turn into a high-order signal, and spectral efficiency is affected. Massive MIMO is a trend of future networks. In a case with a massive antenna, a plurality of signals may be sent simultaneously, and the foregoing peak to average power ratio reduction method has rather limited effect. Therefore, a new method is required to better improve spectrum utilization.

On the other hand, the common PAPR reduction processing involves merely independent processing of single-channel signals, not joint processing of multi-channel signals. For an $N_{Tx}$ transmit antenna system, an actual quantity of sent data flows is less than or equal to $N_{Tx}/2$, which means half of transmit antennas are still available in a space dimension, helping further reduce the PAPR and improve overall system efficiency.

Figure 4:
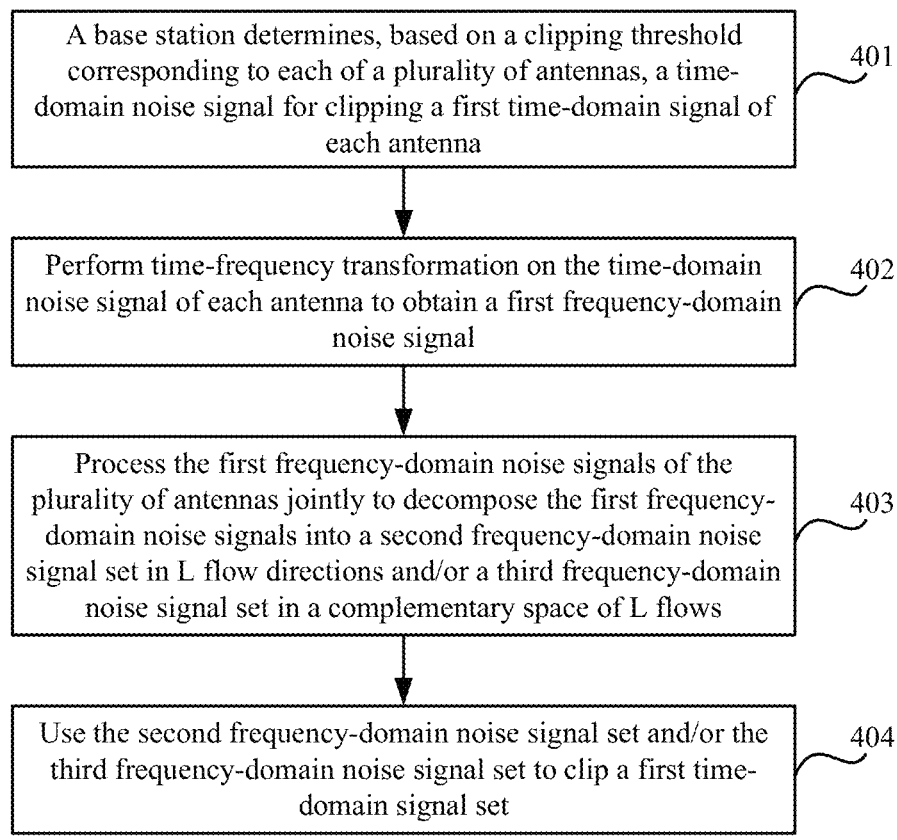
FIG. 4 is a schematic flowchart of a signal quality control method according to an embodiment.

FIG. 4 is a schematic flowchart of a signal quality control method according to an embodiment. The method is applied to a base station having a plurality of antennas, and the base station uses the antennas to send a first time-domain signal set, so as to send L flows, and the method includes the following steps.

In step 401, the base station determines, based on a clipping threshold corresponding to each of the plurality of antennas, a time-domain noise signal for clipping a first time-domain signal of each antenna.

In step 402, a time-frequency transformation is performed on the time-domain noise signal of each antenna to obtain a first frequency-domain noise signal.

In step 403, the first frequency-domain noise signals of the plurality of antennas is processed jointly to decompose the first frequency-domain noise signals into a second frequency-domain noise signal set in L flow directions and/or a third frequency-domain noise signal set in a complementary space of the L flows.

In an example, the L flows are L flows processed using a precoding matrix; and in step 403, the first frequency-domain noise signals of the antennas are processed jointly to decompose, based on the precoding matrix, the first frequency-domain noise signals into the second frequency-domain noise signal set in the L flow directions and the third frequency-domain noise signal set in the complementary space of the L flows.

In step 404, the second frequency-domain noise signal set and/or the third frequency-domain noise signal set is used to clip the first time-domain signal set.

The clipping may be performed in time domain or in frequency domain.

In an example, the second frequency-domain noise signal set is weighted based on a modulation scheme of each of the L flows, and the third frequency-domain noise signal set is weighted based on a weight of the complementary space of the L flows, to obtain a fourth frequency-domain noise signal set; and time-frequency transformation is performed on the first time-domain signal set to obtain a first frequency-domain signal set, and the fourth frequency-domain noise signal set is used in frequency domain to clip the first frequency-domain signal set; or time-frequency transformation is performed on the fourth frequency-domain noise signal set to obtain a fourth time-domain noise signal set, and the fourth time-domain noise signal set is used in time domain to clip the first time-domain signal set.

In an example, the signal quality control method is performed after precoding and before generation of an OFDM signal, and the precoding includes: dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the antennas.

In an example, before the determining, by the base station based on a clipping threshold corresponding to each antenna, a time-domain noise signal for clipping a first time-domain signal of each antenna, the method further includes: performing, by the base station, time-frequency transformation on the first frequency-domain signal set to obtain the first time-domain signal set sent by the antennas.

In another example, the signal quality control method is performed after precoding and before generation of an OFDM signal, and the precoding includes: dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the antennas.

To resolve the foregoing problem, in this embodiment, the base station reduces a peak to average power ratio and improves signal quality by jointly using the information reported by the terminals or based on the uplink measurement information and information that is known to the base station and delivered to the terminals, so as to further improve spectrum utilization.

The following uses an LTE system as an example to describe principles of the embodiments.

Figure 5A:
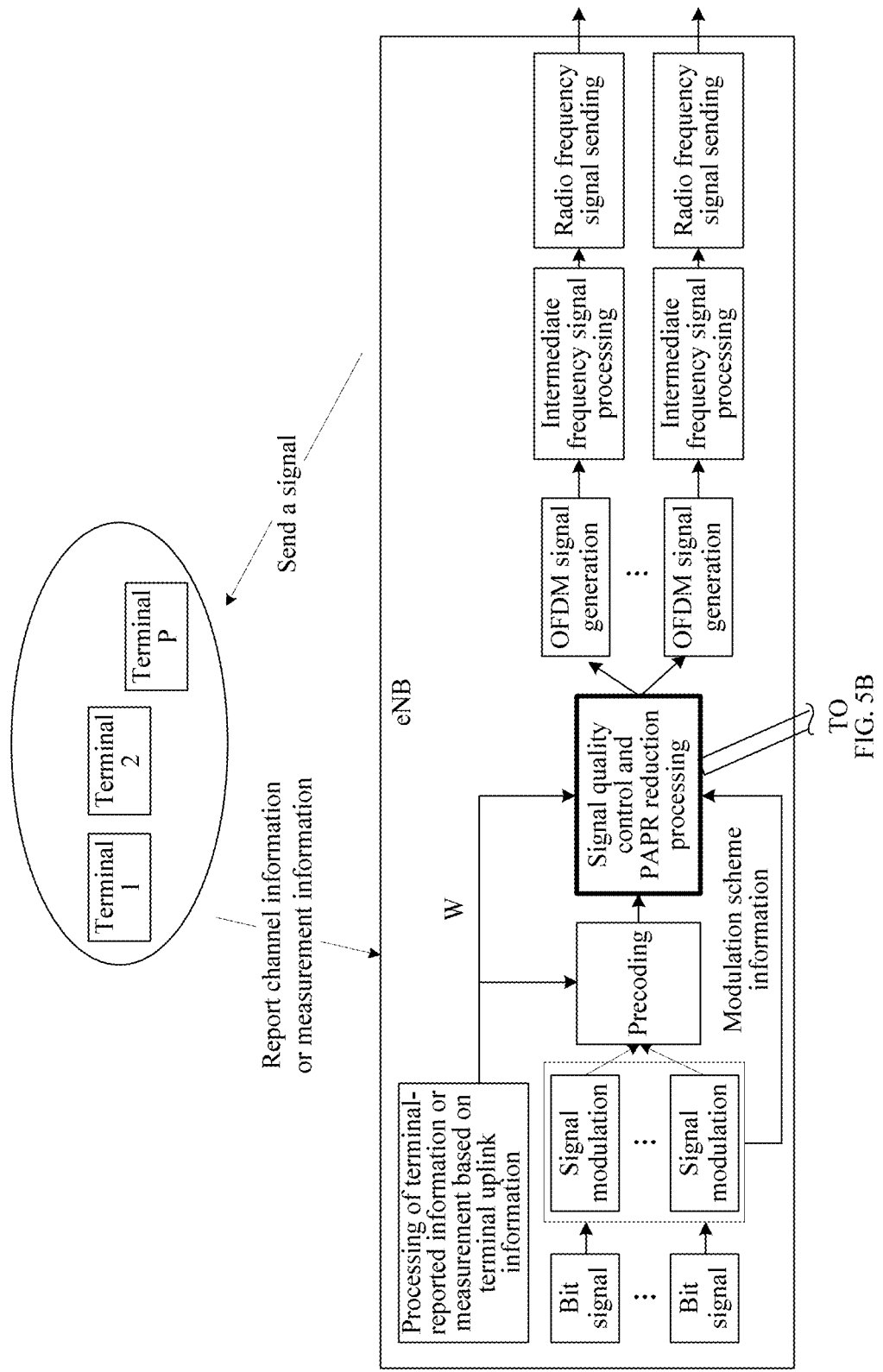
FIG. 5A is a schematic flowchart of another signal quality control method according to an embodiment.
Figure 5B:
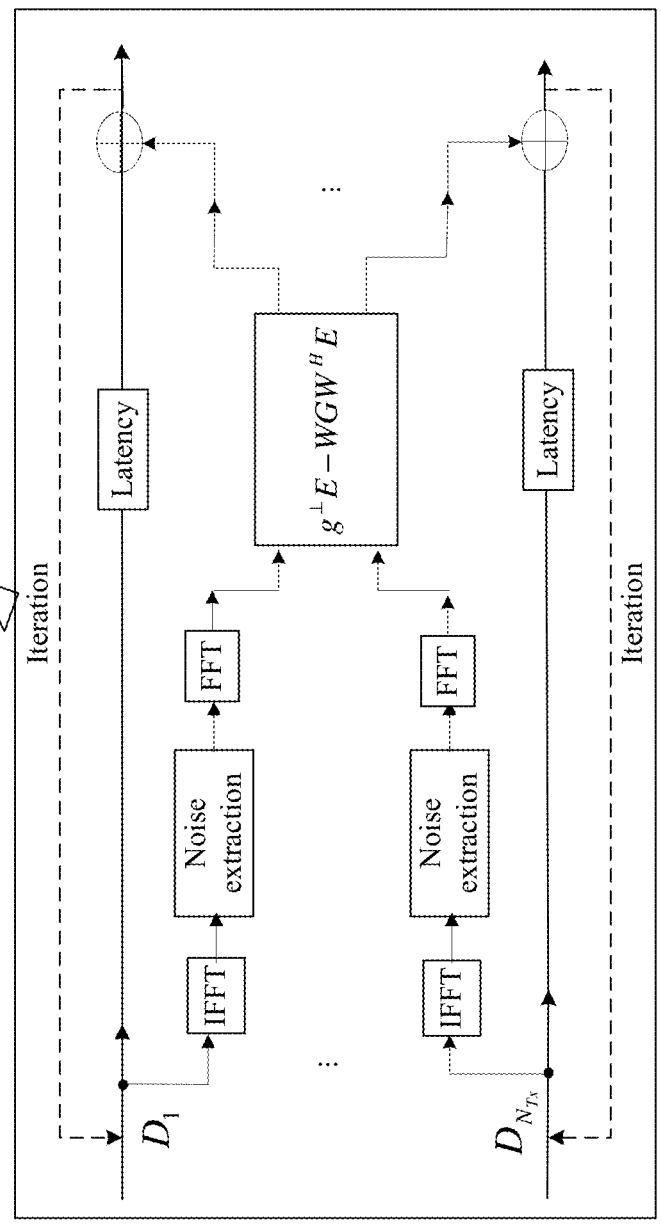
FIG. 5B is another schematic flowchart of another signal quality control method according to an embodiment.

FIG. 5A and FIG. 5B are a schematic flowchart of another signal quality control method according to an embodiment. It is assumed that in an LTE system, the base station divides P terminals into p groups based on respective channel information reported by the P terminals or uplink measurement information, and performs precoding weighting on each group independently, and that the base station also knows modulation information that is sent to each terminal. The following uses a group of terminals as an example to describe an algorithm principle of this embodiment.

It is assumed that the base station uses $N_{Tx}$ antennas for sending, where $W_{N_{Tx} \times L}$ (simply denoted as $W$) is a precoding matrix of $N_{Tx}$ flows. Signals sent by the $N_{Tx}$ antennas are as follows:

$$D = W S_{L \times 1}, \text{ where}$$

$S_{L \times 1}$ represents L data flows.

Then IFFT is performed on data of each antenna to generate $N_{Tx}$ OFDM signals $s_a(t)$, where $a = 1, 2, \ldots, N_{Tx}$.

Assuming that the clipping threshold is $T_a$, where $a = 1, 2, \ldots, N_{Tx}$, a clipping noise $n_a(t)$ of each antenna is as follows:

$$n_a(t) = \begin{cases} \frac{T_a - |s_a(t)|}{|s_a(t)|} s_a(t), & |s_a(t)| > T_a \\ 0, & \text{other} \end{cases}, t = 0, 1, \ldots, N-1,$$

$$a = 1, 2, \ldots, N_{Tx}$$

The foregoing time-domain noise is transformed into a frequency-domain noise.

$$E_a(k) = FFT\{n_a(t)\}, a = 1, 2, \ldots, N_{Tx}$$

Assuming that a frequency-domain noise of $N_{Tx}$ antennas of a $k^{th}$ sampling point is $E_{N_{Tx} \times 1}(k) = [E_1(k), \ldots, E_{N_{Tx}}(k)]^T$, $E_{N_{Tx} \times 1}(k)$ (simply denoted as $E(k)$) may be decomposed as follows based on a beamforming matrix:

$$E(k) = W^{(1)} \cdot c_1(k) + \ldots + W^{(L)} \cdot c_L(k) + W^{\perp} \cdot c_{L+1}(k),$$

where $W^{(i)}$ represents L beam weighting vectors, where $i = 1, 2, \ldots L$; $W^{\perp}$ is a complementary space of $W$; and $c_i(k)$ is a projection coefficient and is calculated as follows:

$$c_i(k) = \frac{(W^{(i)})^H \cdot E(k)}{\|W^{(i)}\|^2},$$

where $i = 1, 2, \ldots L$, then $E^{(i)}(k) = W^{(i)} c_i(k)$, where $i = 1, 2, \ldots L$; and $E^{(\perp)}(k) = E(k) - \sum_{i=1}^{L} E^{(i)}(k)$.

Matrices $W^{(*)}$ are orthogonal to each other, and $W^{\perp}$ is orthogonal to all matrices $W^{(i)}$. Therefore, the EVM introduced by a receiving end of the $i^{th}$ flow is as follows:

$$\sqrt{\frac{\sum \|E^{(i)}\|^2}{\sum \|S^{(i)}\|^2}} \times 100\%,$$

where $S^{(i)}$ is the originally sent signal.

To fully utilize different tolerances of different modulation schemes to noises, parameters $g^i(k)$ and $g^\perp(k)$ are introduced, where $g^i(k)$ is related to the modulation scheme of the $i^{th}$ flow.

A new clipping noise $\hat{E}(k)$ is as follows:

$$\hat{E}(k) = g^\perp(k)E^\perp(k) + \sum_{i=1}^{L} g^i(k)E^{(i)}(k)$$

$E^{(i)}(k)$ and $E^{(\perp)}(k)$ are substituted into the foregoing formula to further derive the following formula:

$$\hat{E}(k) = g^\perp(k)E(k) - WGW^H E(k).$$

$$G = \begin{bmatrix} \frac{g^\perp(k) - g^1(k)}{\|W^{(1)}\|^2} & & O \\ & O & \\ O & & \frac{g^\perp(k) - g^L(k)}{\|W^{(L)}\|^2} \end{bmatrix} \text{ is a diagonal matrix.}$$

In the foregoing formula, noises are allocated to a complementary space of a beam space, utilizing redundant dimensions in space domain. In addition, $g^i(k)$ is introduced to control signal quality (EVM) of different beams, and different tolerances of different modulation schemes to the EVM, namely frequency-domain degrees of freedom, are utilized to greatly reduce the peak to average ratio and improve overall system performance while ensuring signal quality.

A new EVM is as follows:

$$g^{(i)}\sqrt{\frac{\sum \|E^{(i)}\|^2}{\sum \|S^{(i)}\|^2}} \times 100\%$$

A clipped signal is as follows:

$\hat{D}(k) = D(k) - \hat{E}(k)$

The foregoing process presents an $N_{Tx}$-dimension vector computation.

To achieve a better result, the foregoing processing process can be performed iteratively.

The principles are as follows:

In this embodiment, the PAPR is reduced more flexibly with reference to information reported by terminals or information measured by a base station and data characteristics delivered by the base station and by using frequency-domain degrees of freedom and space-domain degrees of freedom, so as to improve overall performance.

In this embodiment, one or more of the following three methods are mainly used. Method 1. An optimal clipping noise allocation solution is obtained based on information reported by terminals or information measured by a base station and data characteristics delivered by the base station, that is, a joint noise allocation solution based on all antennas and all users. Method 2. A clipping noise is allocated to a complementary space of a current precoding space. Method 3. Different magnitudes of clipping noises are allocated based on modulation schemes of different flows sent.

When only method 1 is used, noises can be properly allocated through joint processing based on multiple antennas and multiple users, thereby achieving good signal quality. When method 2 and/or method 3 are used with method 1, signal quality can be further improved. For example, when method 1 is used with method 2, not only can noises be properly allocated in the precoding space, but also clipping noises can be allocated to the complementary space of the current precoding space. When method 1 is used with method 2 and method 3, not only can noises be properly allocated in the precoding space and the complementary space of the current precoding space, but also different magnitudes of clipping noises can be allocated based on sent modulation schemes of different flows.

The signal quality control method provided in the embodiments may be based on a plurality of embodiments.

Figure 6:
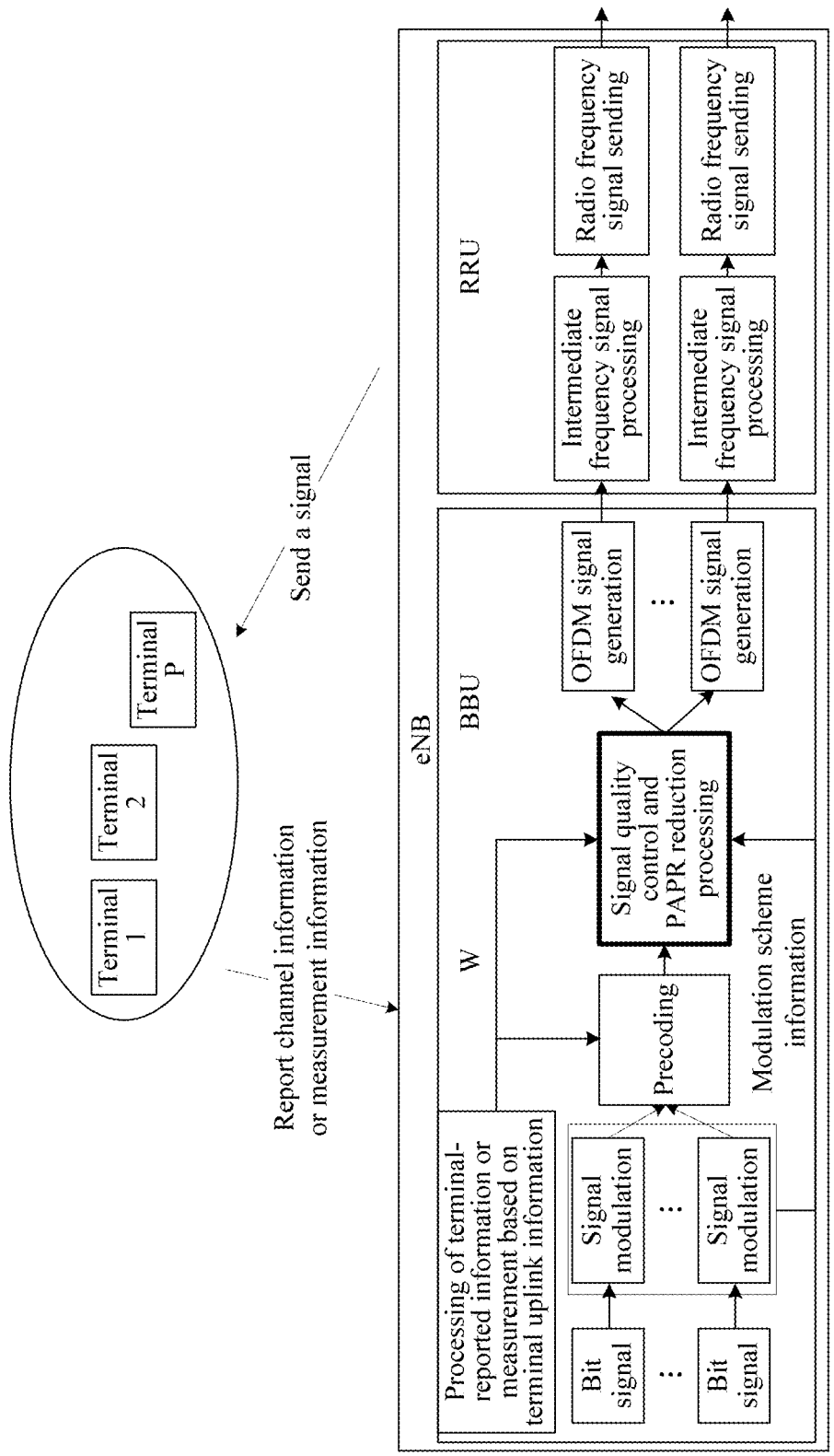
FIG. 6 is a schematic diagram of an embodiment of a signal quality control method according to an embodiment.

FIG. 6 is a schematic diagram of an embodiment of a signal quality control method according to an embodiment. In this embodiment, in an OFDM system, for example, an LTE system, an evolved NodeB (eNB) determines grouping of different terminals based on channel information reported by the terminals or measurement information of the eNB, each group obtains a precoding matrix W, and the eNB performs coding and modulation on all users within the group. The signal quality control method in this embodiment is applied after precoding and before generation of an OFDM signal. In this method, PAPR reduction processing is performed.

Figure 7:
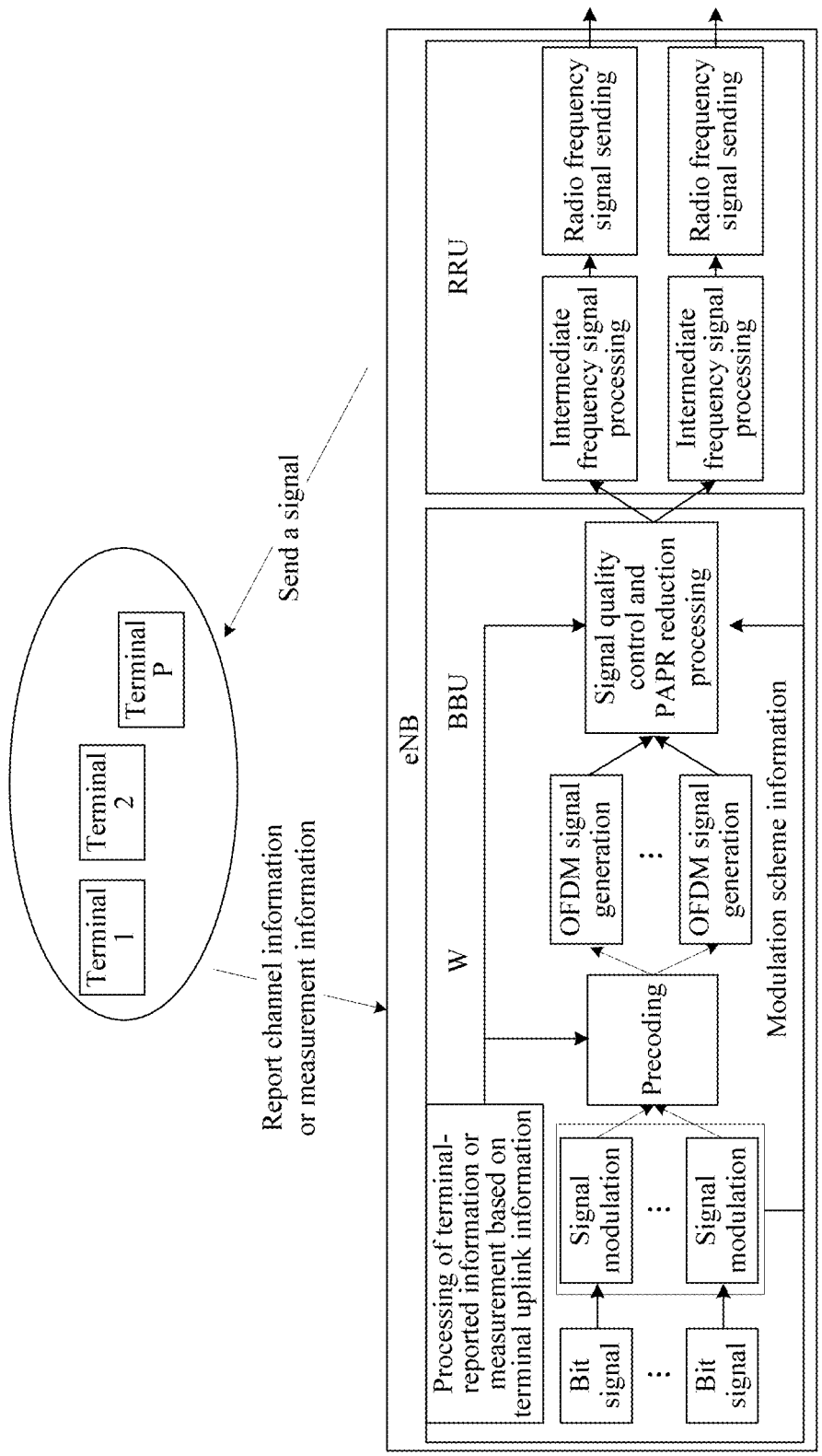
FIG. 7 is a schematic diagram of another embodiment of a signal quality control method according to an embodiment.

FIG. 7 is a schematic diagram of another embodiment of a signal quality control method according to an embodiment. In this embodiment, in an OFDM system, for example, an LTE system, an eNB determines grouping of different terminals based on channel information reported by the terminals or measurement information of the eNB, each group obtains a precoding matrix W, and the eNB performs coding and modulation on all users within the group, and then performs precoding and IFFT to generate an OFDM signal. The signal quality control method in this embodiment is applied after generation of the OFDM signal. In this method, PAPR reduction processing is performed.

Figure 8:
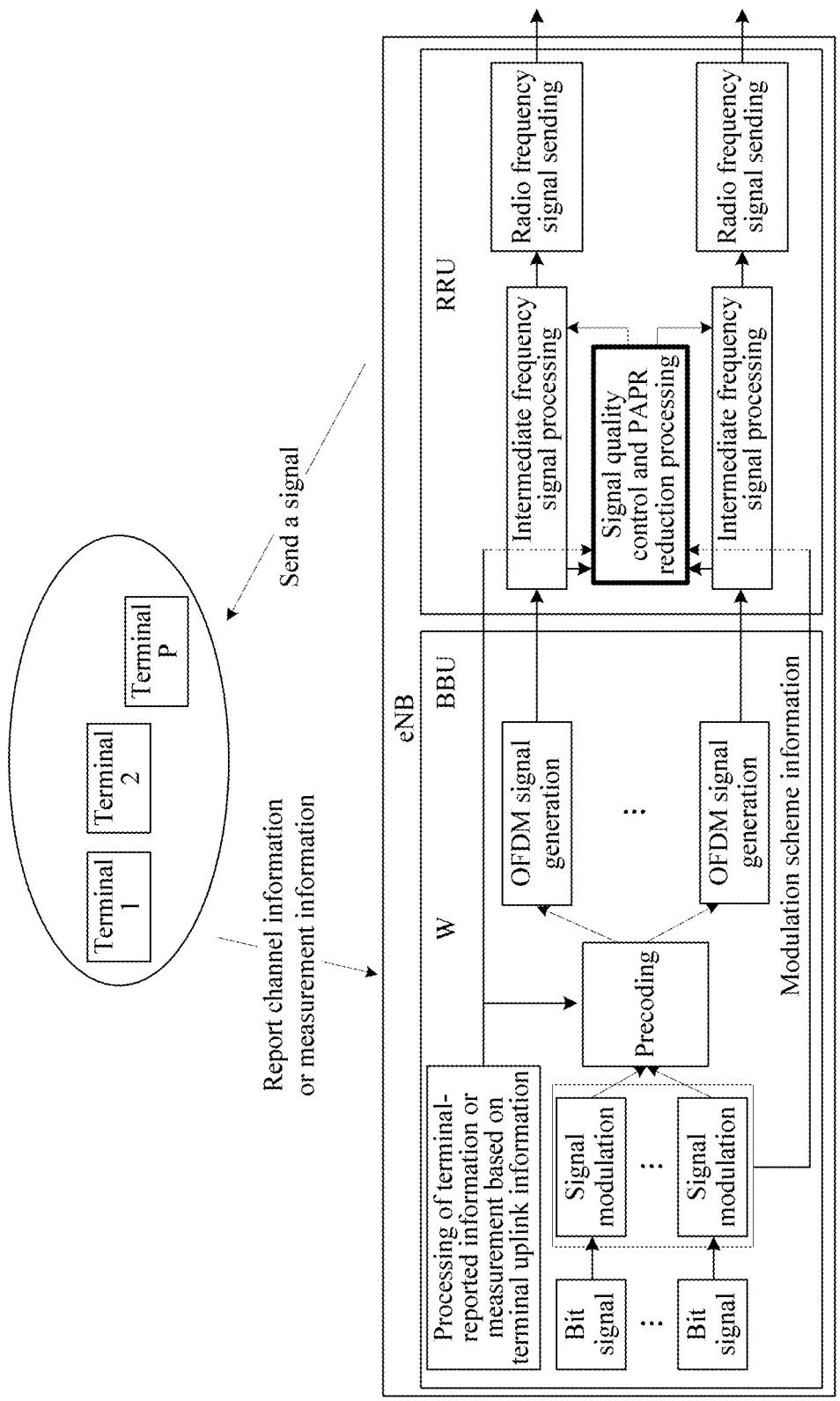
FIG. 8 is a schematic diagram of still another embodiment of a signal quality control method according to an embodiment.

FIG. 8 is a schematic diagram of still another embodiment of a signal quality control method according to an embodiment. In this embodiment, in an OFDM system, for example, an LTE system, an eNB determines grouping of different terminals based on channel information reported by the terminals or measurement information of the eNB, each group obtains a precoding matrix W, and the eNB performs coding and modulation on all users within the group, and then performs precoding and IFFT to generate an OFDM signal. The signal quality control method in this embodiment is applied in intermediate frequency processing after generation of the OFDM signal. In this method, PAPR reduction processing is performed.

The embodiments are mainly applied to the OFDM system. Based on channel information reported by the terminals or uplink measurement information of the eNB, a baseband processing unit (BBU) processes the information and divides the terminals into groups, and each group has a corresponding precoding matrix W. After the signal quality control method in the embodiments is applied in the BBU, the BBU sends a signal to a radio remote unit (RRU) for processing, and then the RRU sends the signal to an air interface. Alternatively, the signal quality control method in the embodiments is applied after an RRU receives a signal of the BBU, and then the RRU sends the signal to an air interface.

The following further describes the signal quality control method in the embodiments based on the foregoing three embodiments.

Figure 9A:
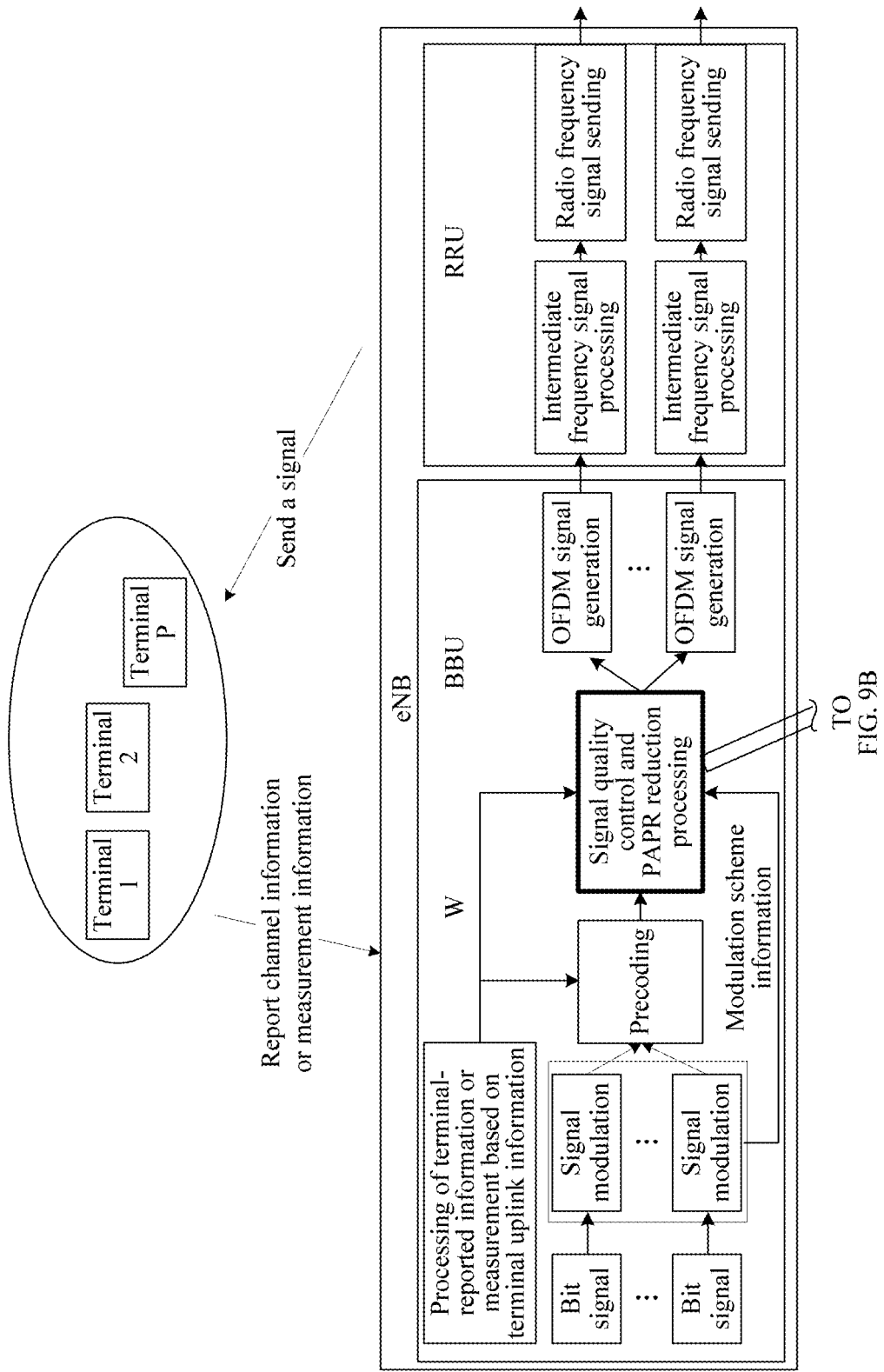
FIG. 9A is a schematic flowchart of a signal quality control method based on the embodiment shown in FIG. 6 according to an embodiment.
Figure 9B:
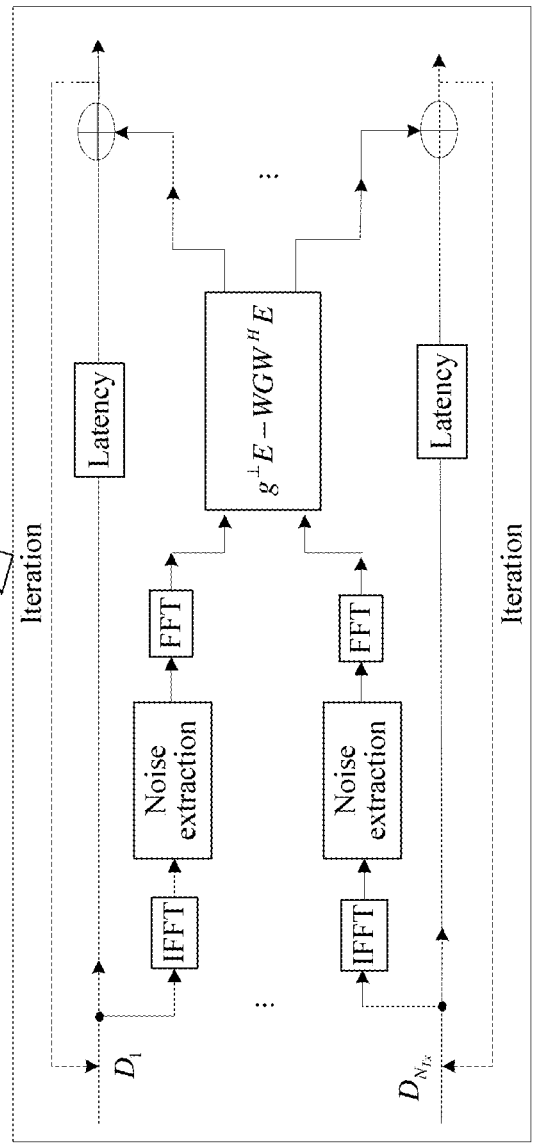
FIG. 9B is a schematic flowchart of a signal quality control method based on the embodiment shown in FIG. 6 according to an embodiment.

FIG. 9A and FIG. 9B are schematic flowcharts of a signal quality control method based on the embodiment shown in FIG. 6 according to an embodiment. For example, in a scenario in which a time division duplex (TDD) mode of an LTE system is used, an eNB obtains channel information Hi of each terminal based on an uplink measurement value, where l=0, 1, . . . , P. The eNB divides p terminals into one group, and calculates a precoding matrix W based on channel information Hi of all users within the group. It is assumed that the base station uses transmit antennas $N_{Tx}$=8, the terminal uses two antennas for receiving, p=2, and each terminal sends two flows. Therefore, a total transmit vector is S=[S11, S12, S21, S22]$^T$, and an 8-dimension vector D=WS is obtained after precoding, where W is an 8×4 matrix.

In an example, a processing process of this embodiment is as follows:

In step 1, for a symbol with a length of N, IFFT is performed on each row of D to obtain a time-domain OFDM symbol signal, where D is an 8×N' (N'≤N) matrix.

In step 2, for eight time-domain OFDM signals sa(t), where a=1, 2, . . . , 8, a noise is extracted. Assuming that a clipping threshold is $T_a$, where a=1, 2, . . . , 8, a clipping noise $n_a(t)$ of each antenna is as follows:

$$n_a(t) = \begin{cases} \frac{T_a - |s_a(t)|}{|s_a(t)|} s_a(t), & |s_a(t)| > T_a \\ 0, & \text{other} \end{cases}, t = 0, 1, \ldots, N-1,$$

$$a = 1, 2, \ldots, 8$$

In step 3, $n_a(t)$ is transformed into a frequency-domain noise.

$\hat{E}_a(k) = FFT\{n_a(t)\}, a=1,2,\ldots,8$

In step 4, the frequency-domain noises are processed jointly.

$\hat{E}(k) = g^\perp(k)E(k) - WGW^H E(k)$ $g^\perp(k)$ and $g^i(k)$ are respectively a weight for allocating a noise in a redundant space and a weight for allocating a noise to each data flow, and values are determined based on an actual situation. For example, if all current data flows are highest-order modulated data, a value of $g^i(k)$ should be as small as possible or 0, and in practice, the value of $g^i(k)$ may be determined according to a preset EVM of each data flow. However, $g^\perp(k)$ is related to redundancy in a current quantity of antennas compared to a total quantity of actually sent data flows. A larger quantity of antennas compared to the quantity of sent data flows indicates a larger value of $g^\perp(k)$; a smaller quantity of antennas compared to the quantity of sent data flows indicates a smaller the value of $g^\perp(k)$.

In step 5, a signal is cancelled.

$\hat{D}_a(k) = D_a(k) - \hat{E}_a(k), k=0,1,\ldots,N-1;a=1,2,\ldots,8$

Various values in the process described above, for example, a transmit antenna quantity of a base station, a receive antenna quantity of a terminal, a value of p, and a quantity of sent data flows, are merely used for description, and any other value may be used in practice. In addition, one OFDM symbol may alternatively be a plurality of groups of different W.

Figure 10:
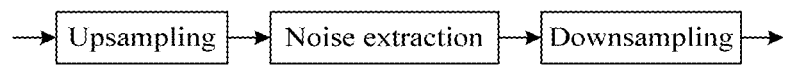
FIG. 10 is a schematic diagram of a processing manner for extracting noise according to an embodiment.

In addition, the extracting a noise in step 2 may be performed in a manner shown in FIG. 10: upsampling $s_a(t)$, extracting a noise at a high rate, and downsampling the extracted noise to 1× rate.

Figure 11A:
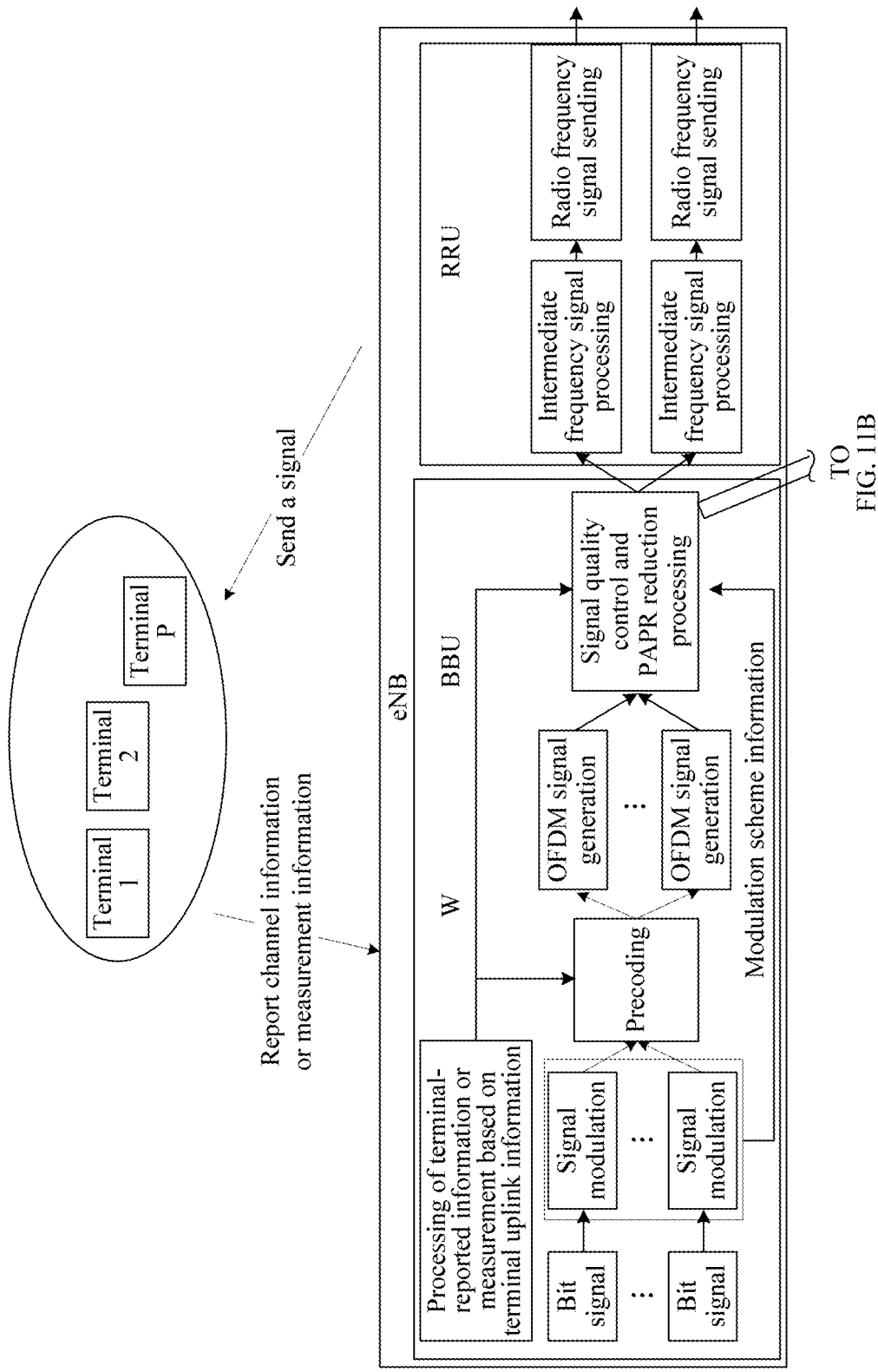
FIG. 11A is a schematic flowchart of a signal quality control method based on the embodiment shown in FIG. 7 according to an embodiment.
Figure 11B:
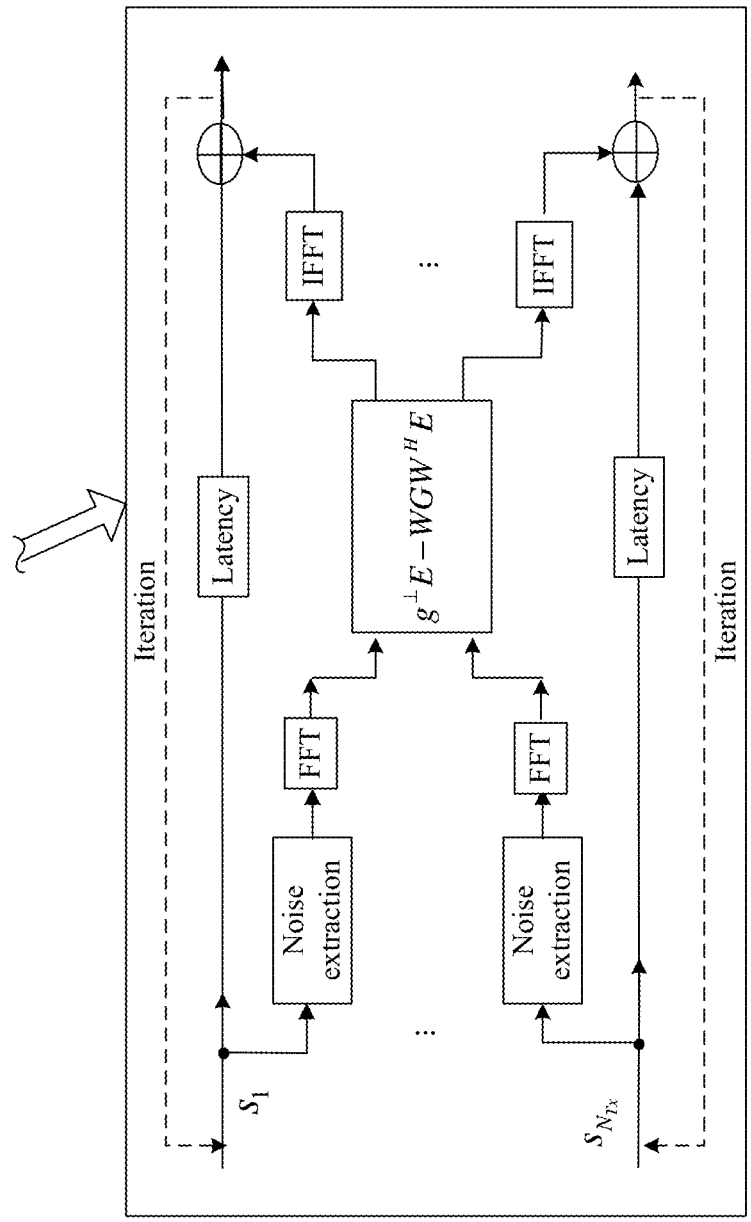
FIG. 11B is a schematic flowchart of a signal quality control method based on the embodiment shown in FIG. 7 according to an embodiment.

FIG. 11A and FIG. 11B are schematic flowcharts of a signal quality control method based on the embodiment shown in FIG. 7 according to an embodiment. The entire processing process of the signal quality control method may be performed after generation of an OFDM signal. The corresponding processing process is as follows:

In step 1, a noise is extracted.

For eight time-domain OFDM signals $s_a(t)$, where a=1, 2, . . . , 8, a noise is extracted. Assuming that a clipping threshold is $T_a$, where a=1, 2, . . . , 8, a clipping noise $n_a(t)$ of each antenna is as follows:

$$n_a(t) = \begin{cases} \frac{T_a - |s_a(t)|}{|s_a(t)|} s_a(t), & |s_a(t)| > T_a \\ 0, & \text{other} \end{cases}, t = 0, 1, \ldots, N-1,$$

$$a = 1, 2, \ldots, 8$$

In step 2, $n_a(t)$ is transformed into a frequency-domain noise.

$E_a(k) = FFT\{n_a(t)\}, a=1,2,\ldots,8$

In step 3, the frequency-domain noises are processed jointly.

$\hat{E}(k) = g^\perp(k)E(k) - WGW^H E(k)$

In step 4, the frequency-domain noise is transformed into a time-domain noise.

$\hat{e}_a(k) = IFFT\{\hat{E}_a(t)\}, a=1,2,\ldots,8$

In step 5, a signal is canceled.

$\hat{s}_a(k) = s_a(k) - \hat{e}_a(k), k=0,1\ldots,N-1;a=1,2,\ldots,8$

The extracting a noise in step 1 may also be performed in a manner shown in FIG. 10.

Figure 12A:
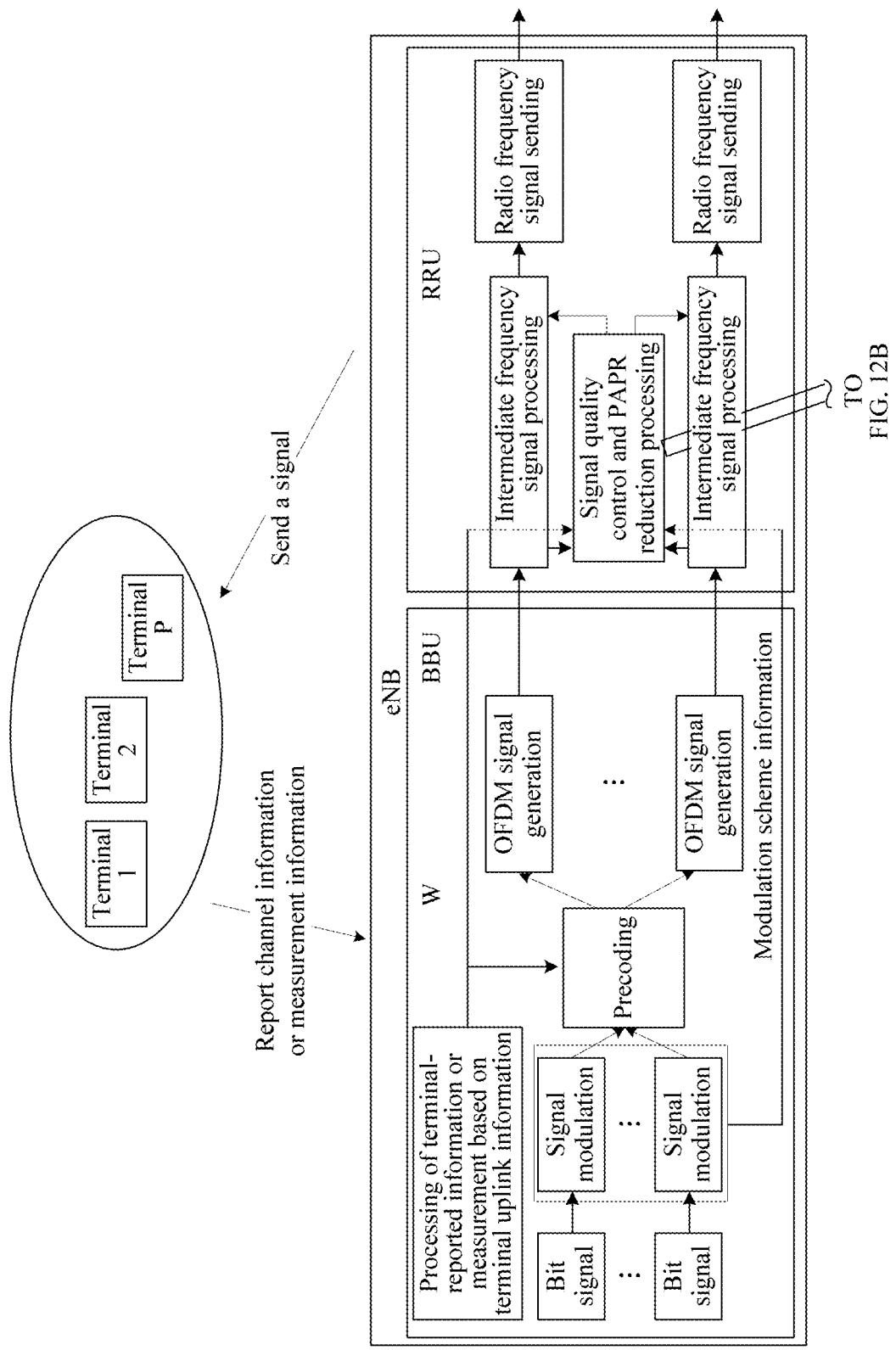
FIG. 12A is a schematic flowchart of a signal quality control method based on the embodiment shown in FIG. 8 according to an embodiment.
Figure 12B:
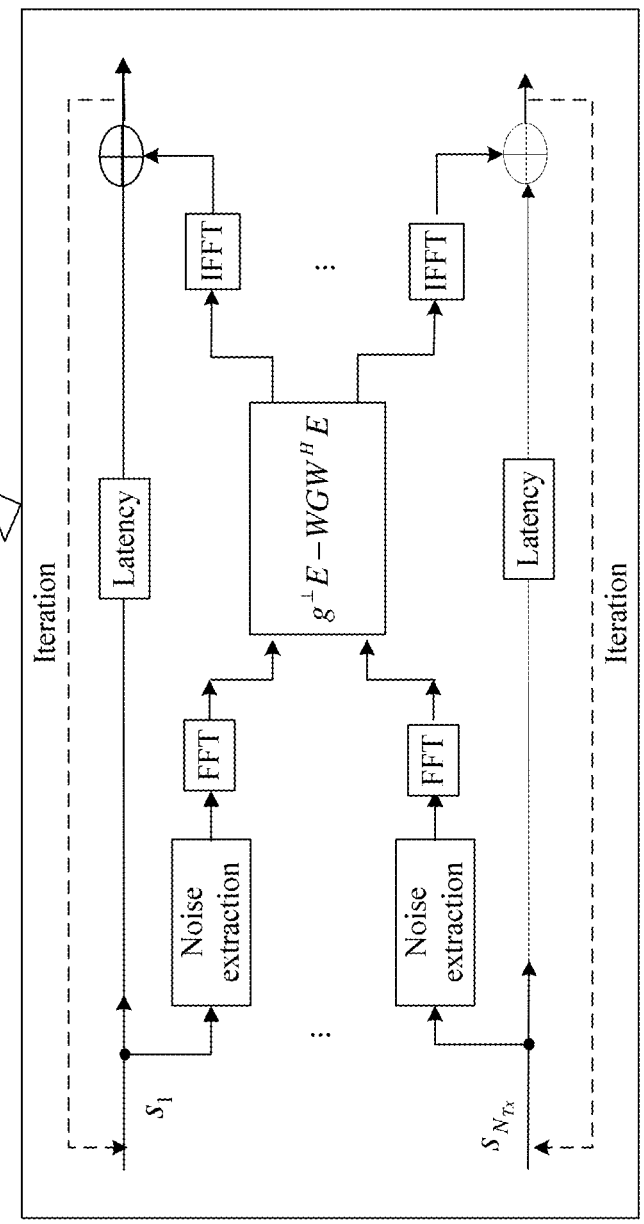
FIG. 12B is a schematic flowchart of a signal quality control method based on the embodiment shown in FIG. 8 according to an embodiment.

FIG. 12A and FIG. 12B are schematic flowcharts of a signal quality control method based on the embodiment shown in FIG. 8 according to an embodiment. An entire process of the signal quality control method may be alternatively processed in an RRU. Different from processing in a BBU, when the signal quality control method in this embodiment is performed in the RRU, modulation information and a precoding matrix need to be transmitted to the RRU. Other overall processing steps are the same as those shown in FIG. 11A and FIG. 11B, and details are not described herein.

Another expression $\hat{E}(k) = G^\perp E(k) + GE(k)$ may be alternatively used for processing in step 4 in FIG. 10 and step 3 in FIG. 11A and FIG. 11B, where $G^\perp$ is a matrix, and is an orthogonal matrix calculated based on H of all terminals, for example, calculated through singular value decomposition (SVD); and G is a diagonal matrix whose element value is related to a modulation scheme of a sent data flow.

For example:

$$\hat{E}(k) = \left( g^\perp(k)I - W \begin{bmatrix} \frac{g^\perp(k)}{\|W^{(1)}\|^2} & & O \\ & \ddots & \\ O & & \frac{g^\perp(k)}{\|W^{(L)}\|^2} \end{bmatrix} W^H \right) E(k) +$$

$$W \begin{bmatrix} \frac{g^1(k)}{\|W^{(1)}\|^2} & & O \\ & \ddots & \\ O & & \frac{g^L(k)}{\|W^{(L)}\|^2} \end{bmatrix} W^H E(k)$$

Figure 13:
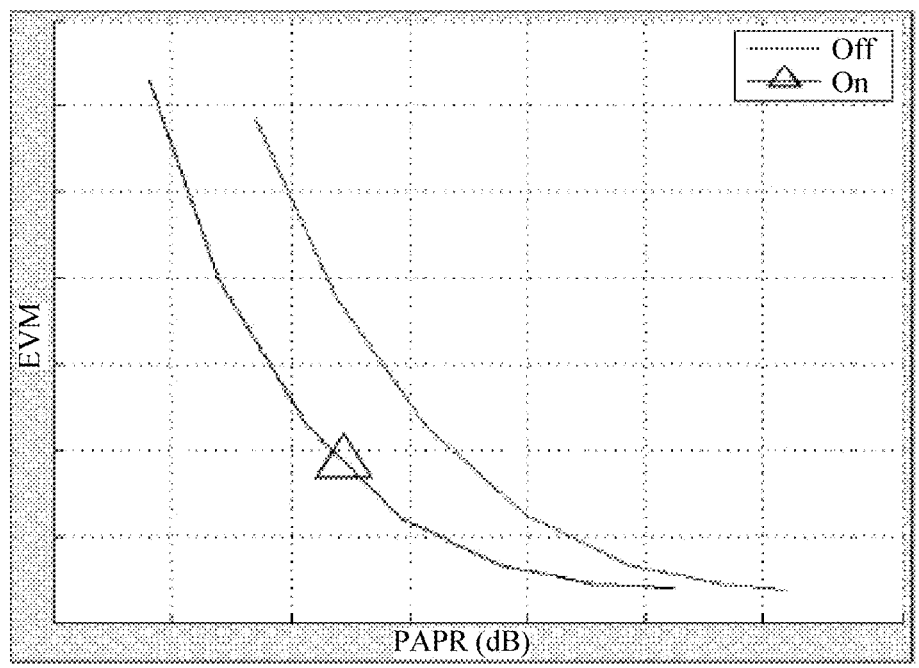
FIG. 13 is an actual effect comparison diagram according to an embodiment.

The signal quality control method provided in this embodiment can achieve a good actual effect. FIG. 13 is an actual effect comparison diagram according to an embodiment, where $N_{Tx}=8$, p=2, a terminal has two receive antennas, and 64QAM is used for all sent data. Because actually sent data has only four flows, for a base station having eight transmit antennas, there are still four redundant spaces. In this embodiment, noises are allocated to these redundant spaces, so that the PAPR and EVM can be greatly reduced. A curve with a triangle symbol in FIG. 13 presents an effect obtained after this embodiment is applied. It can be seen that, under the same PAPR value, this embodiment can make an EVM of a signal much better, by about one to three cells; and under a same EVM value, this embodiment can make a PAPR of a signal lower, by about one cell. This embodiment is much better than a common solution, regardless of whether it is from the perspective of the PAPR or the EVM.

Figure 14:
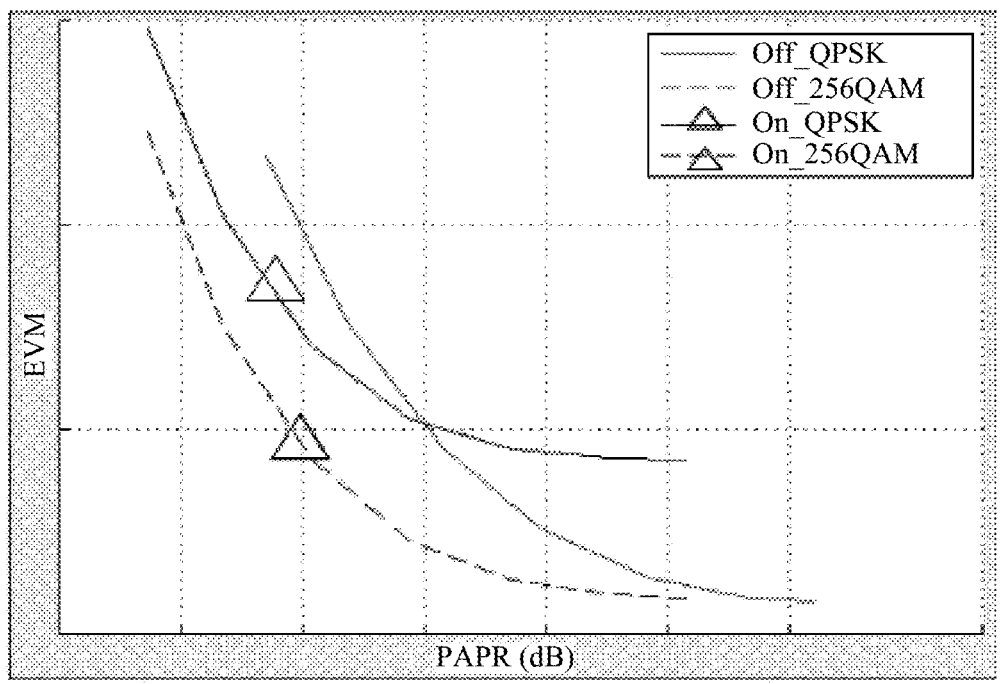
FIG. 14 is another actual effect comparison diagram according to an embodiment.

FIG. 14 is another actual effect comparison diagram according to an embodiment, where $N_{Tx}=8$, p=2, a terminal has two receive antennas, and QPSK and 256QAM are used for sent data. Because actually sent data has only four flows, for a base station having eight transmit antennas, there are still four redundant spaces. In addition, because an EVM tolerance of QPSK is much greater than that of 256QAM (17.5% versus 3.5%), noises are allocated to a redundant space, and further, more noises can be allocated to a modulation scheme with a higher EVM tolerance (for example, QPSK). In this way, spatial redundancy and different EVM tolerances of different modulation schemes are fully utilized to greatly reduce the PAPR and the EVM, and greatly reduce a high-order modulation EVM. In other words, high-order modulation is easier to schedule, and greatly increases the system throughput. A curve with a triangle icon in FIG. 14 presents an effect obtained after this embodiment is applied. A curve without a triangle icon in FIG. 14 presents a result of a prior-art solution, where a dashed line overlaps with a solid line, the solid line represents QPSK, and the dashed line represents 256QAM. It can be seen that, under a same PAPR value, this embodiment can make an EVM of a 256QAM signal much better, and can also ensure a good enough EVM of QPSK; and under the same EVM, it can also be seen that the PAPR in this embodiment is lower than that in the prior art. In this embodiment, spatial redundancy and EVM tolerances of different modulation schemes are used to greatly reduce a high-order modulation EVM while ensuring that the PAPR is reduced and a low-order modulation scheme EVM meets a requirement, so that high-order modulation can be more easily scheduled and a system throughput is greatly increased.

The foregoing mainly describes the solutions provided in the embodiments from the perspective of a signal processing process. It may be understood that, to implement the foregoing functions, the base station includes corresponding hardware structures and/or software modules for performing the functions. A person of ordinary skill in the art should understand that, in combination with the examples described in the embodiments disclosed herein, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope.

In the embodiments, the base station and the like may be divided into function modules based on the foregoing method examples. For example, function modules corresponding to various functions may be obtained through division, or two or more functions may be integrated into one processing module. The integrated module may be implemented in a form of hardware, or may be implemented in a form of a software function module. It should be noted that, in the embodiments, module division is an example, and is merely a logical function division. In actual implementation, another division manner may be used.

Figure 15:
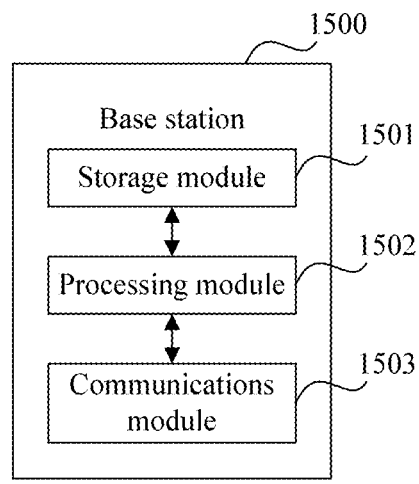
FIG. 15 is a schematic structural diagram of a base station according to an embodiment.

When the integrated module is used, FIG. 15 is a possible schematic structural diagram of the base station in the foregoing embodiments. The base station 1500 includes a processing module 1502 and a communications module 1503. The processing module 502 is configured to control and manage actions of the base station. For example, the processing module 1502 is configured to support the base station in performing processes 401 to 404 in FIG. 4, and/or configured to perform other processes of the technology described herein. The communications module 1503 is configured to support communication between the base station and another network element, for example, communication between the base station and a terminal. The base station may further include a storage module 1501, configured to store program code and data of the base station.

The processing module 1502 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processor/controller may implement or execute various example logical blocks, modules, and circuits described with reference to content disclosed herein. Alternatively, the processor may be a combination of processors implementing a computing function, for example, a combination of one or more microprocessors, or a combination of the DSP and a microprocessor. The communications module 1503 may be a communications interface, a transceiver, a transceiver circuit, or the like. The communications interface is a collective term and may include one or more interfaces. The storage module 1501 may be a memory.

Figure 16:
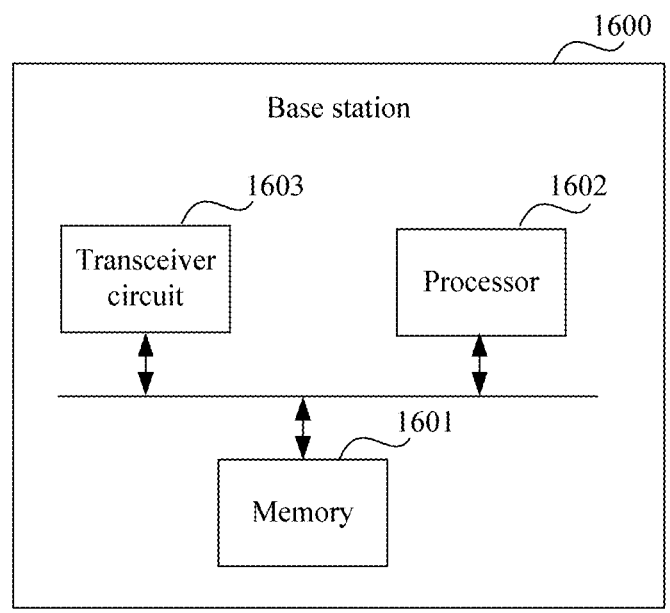
FIG. 16 is a schematic structural diagram of another base station according to an embodiment.

When the processing module 1502 is a processor, the communications module 1503 is a transceiver circuit, and the storage module 1501 is a memory, the base station in this embodiment may be a base station shown in FIG. 16.

As shown in FIG. 16, the base station 1600 includes a processor 1602, a transceiver circuit 1603, and a memory 1601. The transceiver circuit 1603, the processor 1602, and the memory 1601 may be connected to each other through a communication connection. The transceiver circuit 1603 is connected to a plurality of antennas.

Method or algorithm steps may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. The storage medium may be a component of the processor. The processor and the storage medium may be located in the ASIC. In addition, the ASIC may be located in a core network interface device. The processor and the storage medium may exist in the core network interface device as discrete components.

A person of ordinary skill in the art should understand that in the foregoing one or more examples, functions may be implemented by hardware, software, firmware, or any combination thereof. When an embodiment is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the embodiments are further described in detail in the foregoing embodiments. It should be understood that the foregoing descriptions are merely embodiments, but are not intended to limit the protection scope. Any modification, equivalent replacement, or improvement made based on the technical solutions shall fall within the protection scope.

The invention claimed is:

1. A signal quality control method, wherein the method is applied to a base station having a plurality of antennas, the base station uses the plurality of antennas to send a first time-domain signal set, so as to send L flows, the method comprising:
   determining, by the base station based on a clipping threshold corresponding to each of the plurality of antennas, a time-domain noise signal for clipping a first time-domain signal of each antenna;
   performing time-frequency transformation on the time-domain noise signal of each antenna to obtain a first frequency-domain noise signal;
   processing the first frequency-domain noise signals of the plurality of antennas jointly to decompose the first frequency-domain noise signals into a second frequency-domain noise signal set in L flow directions and/or a third frequency-domain noise signal set in a complementary space of the L flows; and
   clipping the first time-domain signal set using the second frequency-domain noise signal set and/or the third frequency-domain noise signal set.

2. The method according to claim 1, wherein the using of the second frequency-domain noise signal set and/or the third frequency-domain noise signal set to clip the first time-domain signal set comprises:
   weighting the second frequency-domain noise signal set based on a modulation scheme of each of the L flows and weighting the third frequency-domain noise signal set based on a weight of the complementary space of the L flows to obtain a fourth frequency-domain noise signal set; and
   performing time-frequency transformation on the first time-domain signal set to obtain a first frequency-domain signal set, and using the fourth frequency-domain noise signal set in frequency domain to clip the first frequency-domain signal set; or performing time-frequency transformation on the fourth frequency-domain noise signal set to obtain a fourth time-domain noise signal set, and using the fourth time-domain noise signal set in time domain to clip the first time-domain signal set.

3. The method according to claim 1, wherein the signal quality control method is performed after precoding and before generation of an orthogonal frequency division multiplexing (OFDM) signal, and the precoding comprises:
   dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the plurality of antennas.

4. The method according to claim 3, wherein before the determining, by the base station based on a clipping threshold corresponding to each antenna, of the time-domain noise signal for clipping a first time-domain signal of each antenna, the method further comprises:
   performing, by the base station, time-frequency transformation on the first frequency-domain signal set to obtain the first time-domain signal set sent by the plurality of antennas.

5. The method according to claim 1, wherein the signal quality control method is performed after precoding and generation of an orthogonal frequency division multiplexing (OFDM) signal, and the precoding comprises:
   dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the plurality of antennas.

6. The method according to claim 2, wherein the L flows are L flows processed using a precoding matrix; and
   the processing of the first frequency-domain noise signals of the plurality of antennas jointly to decompose the first frequency-domain noise signals into a second frequency-domain noise signal set in L flow directions and/or a third frequency-domain noise signal set in a complementary space of the L flows comprises:
   processing the first frequency-domain noise signals of the plurality of antennas jointly to decompose, based on the precoding matrix, the first frequency-domain noise signals into the second frequency-domain noise signal set in the L flow directions and/or the third frequency-domain noise signal set in the complementary space of the L flows.

7. A base station, the base station comprising a plurality of antennas to send a first time-domain signal set, so as to send L flows; and the base station further comprising
   a memory configured to store a communication instruction; and
   a processor configured to perform the following operations based on the communication instruction stored in the memory:

determining, based on a clipping threshold corresponding to each of the plurality of antennas, a time-domain noise signal for clipping a first time-domain signal of each antenna;

performing time-frequency transformation on the time-domain noise signal of each antenna to obtain a first frequency-domain noise signal;

processing the first frequency-domain noise signals of the plurality of antennas jointly to decompose the first frequency-domain noise signals into a second frequency-domain noise signal set in L flow directions and/or a third frequency-domain noise signal set in a complementary space of the L flows; and using the second frequency-domain noise signal set and/or the third frequency-domain noise signal set to clip the first time-domain signal set.

8. The base station according to claim 7, wherein the processor performs the operation of using the second frequency-domain noise signal set and/or the third frequency-domain noise signal set to clip the first time-domain signal set, and the operation comprises:

weighting the second frequency-domain noise signal set based on a modulation scheme of each of the L flows, and weighting the third frequency-domain noise signal set based on a weight of the complementary space of the L flows to obtain a fourth frequency-domain noise signal set; and performing time-frequency transformation on the first time-domain signal set to obtain a first frequency-domain signal set, and using the fourth frequency-domain noise signal set in frequency domain to clip the first frequency-domain signal set; or performing time-frequency transformation on the fourth frequency-domain noise signal set to obtain a fourth time-domain noise signal set, and using the fourth time-domain noise signal set in time domain to clip the first time-domain signal set.

9. The base station according to claim 7, wherein the processor is configured to perform the operation after precoding and before generation of an orthogonal frequency division multiplexing (OFDM) signal; and the precoding comprises:

dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the plurality of antennas.

10. The base station according to claim 9, wherein the processor is further configured to: before performing the operation of determining, based on a clipping threshold corresponding to each antenna, of the time-domain noise signal for clipping a first time-domain signal of each antenna, perform the following operation according to a program instruction stored in the memory:

performing time-frequency transformation on the first frequency-domain signal set to obtain the first time-domain signal set sent by the plurality of antennas.

11. The base station according to claim 7, wherein the processor is configured to perform the operation after precoding and generation of an orthogonal frequency division multiplexing (OFDM) signal; and the precoding comprises:

dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the plurality of antennas.

12. The base station according to claim 8, wherein the L flows are L flows processed using a precoding matrix; and the processor processes the first frequency-domain noise signals of the plurality of antennas jointly to decompose the first frequency-domain noise signals into a second frequency-domain noise signal set in L flow directions and/or a third frequency-domain noise signal set in a complementary space of the L flows, the processing comprising:

processing the first frequency-domain noise signals of the plurality of antennas jointly to decompose, based on the precoding matrix, the first frequency-domain noise signals into the second frequency-domain noise signal set in the L flow directions and/or the third frequency-domain noise signal set in the complementary space of the L flows.

13. A non-transitory computer readable storage medium for storing a program, wherein the program comprises an instruction, and when the instruction is executed by a base station, the base station is enabled to perform the method, comprising:

determining, by the base station based on a clipping threshold corresponding to each of a plurality of antennas, a time-domain noise signal for clipping a first time-domain signal of each antenna;

performing time-frequency transformation on the time-domain noise signal of each antenna to obtain a first frequency-domain noise signal;

processing the first frequency-domain noise signals of the plurality of antennas jointly to decompose the first frequency-domain noise signals into a second frequency-domain noise signal set in L flow directions and/or a third frequency-domain noise signal set in a complementary space of the L flows; and using the second frequency-domain noise signal set and/or the third frequency-domain noise signal set to clip the first time-domain signal set.

14. The non-transitory computer readable storage medium according to claim 13, wherein the using of the second frequency-domain noise signal set and/or the third frequency-domain noise signal set to clip the first time-domain signal set comprises:

weighting the second frequency-domain noise signal set based on a modulation scheme of each of the L flows, and weighting the third frequency-domain noise signal set based on a weight of the complementary space of the L flows, to obtain a fourth frequency-domain noise signal set; and performing time-frequency transformation on the first time-domain signal set to obtain a first frequency-domain signal set, and using the fourth frequency-domain noise signal set in frequency domain to clip the first frequency-domain signal set; or performing time-frequency transformation on the fourth frequency-domain noise signal set to obtain a fourth time-domain noise signal set, and using the fourth time-domain noise signal set in time domain to clip the first time-domain signal set.

15. The non-transitory computer readable storage medium according to claim 13, wherein the signal quality control method is performed after precoding and before generation of an orthogonal frequency division multiplexing (OFDM) signal, and the precoding comprises:

dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the plurality of antennas.

16. The non-transitory computer readable storage medium according to claim 15, wherein before the determining, by the base station based on the clipping threshold corresponding to each antenna, a time-domain noise signal for clipping a first time-domain signal of each antenna, further comprising:

performing, by the base station, time-frequency transformation on the first frequency-domain signal set to obtain the first time-domain signal set sent by the plurality of antennas.

17. The non-transitory computer readable storage medium according to claim 13, wherein the signal quality control method is performed after precoding and generation of an orthogonal frequency division multiplexing (OFDM) signal, and the precoding comprises:

dividing, by the base station, P terminals into p groups based on respective channel information reported by the P terminals or uplink measurement information, performing precoding weighting on L flows of each group of terminals independently, and obtaining, based on a precoding matrix corresponding to each group of terminals, the first frequency-domain signal set sent by the plurality of antennas.

18. The non-transitory computer readable storage medium according to claim 14, wherein the L flows are L flows processed using a precoding matrix; and the processing of the first frequency-domain noise signals of the plurality of antennas jointly to decompose the first frequency-domain noise signals into the second frequency-domain noise signal set in L flow directions and/or a third frequency-domain noise signal set in a complementary space of the L flows comprises:

processing the first frequency-domain noise signals of the plurality of antennas jointly to decompose, based on the precoding matrix, the first frequency-domain noise signals into the second frequency-domain noise signal set in the L flow directions and/or the third frequency-domain noise signal set in the complementary space of the L flows.

* * * * *